United States Patent [19]

Brett

[11] Patent Number: 5,632,459

[45] Date of Patent: May 27, 1997

[54] ANGLE HEAD TRIPOD

[76] Inventor: Kenneth S. Brett, Ambleside, Darrs Lane, Northchurch, Berkhamsted HP4 3TT, England

[21] Appl. No.: 374,683

[22] PCT Filed: Jul. 27, 1993

[86] PCT No.: PCT/GB93/01580

§ 371 Date: Jan. 26, 1995

§ 102(e) Date: Jan. 26, 1995

[87] PCT Pub. No.: WO94/02774

PCT Pub. Date: Feb. 3, 1994

[30] Foreign Application Priority Data

Jul. 28, 1992 [GB] United Kingdom ............. 9216003

[51] Int. Cl.$^6$ ............................................. G03B 17/00
[52] U.S. Cl. ................... 248/122.1; 248/168; 248/176.3; 248/177.1; 248/286.1
[58] Field of Search ..................... 248/122.1, 124.1, 248/168, 170, 177.1, 178.1, 179.1, 181.1, 182.1, 286.1, 176.1, 176.3; 354/293

[56] References Cited

U.S. PATENT DOCUMENTS 1,429,443  9/1922  McFaddin ............. 248/124.1 X
2,844,345  7/1958  Sherman ............... 248/122.1
3,114,529  12/1963  Mills .................. 248/168
4,671,478  6/1987  Schoenig et al. ....... 248/124.1

FOREIGN PATENT DOCUMENTS 2192717  2/1974  France .
2208540  6/1974  France .
2560965  9/1985  France .
2453096  5/1976  Germany .
2845509  4/1980  Germany .
905332   9/1962  United Kingdom .

Primary Examiner—Derek J. Berger
Attorney, Agent, or Firm—Fay, Sharpe, Beall, Fagan, Minnich & McKee

[57] ABSTRACT

A stand for a camera comprises a tripod which pivotally supports a camera mounting pillar 8. The camera mounting pillar 8 is formed with a pivoting lockable joint 18 which allows the camera to be positioned with a greater amount of flexibility at levels close to the ground than is possible with just a ball joint. The camera mounting column 8 and one of the tripod legs can be separated from the stand and joined together to form a monopod which can be folded about the pivoting joint 18 for compact carriage.

19 Claims, 4 Drawing Sheets

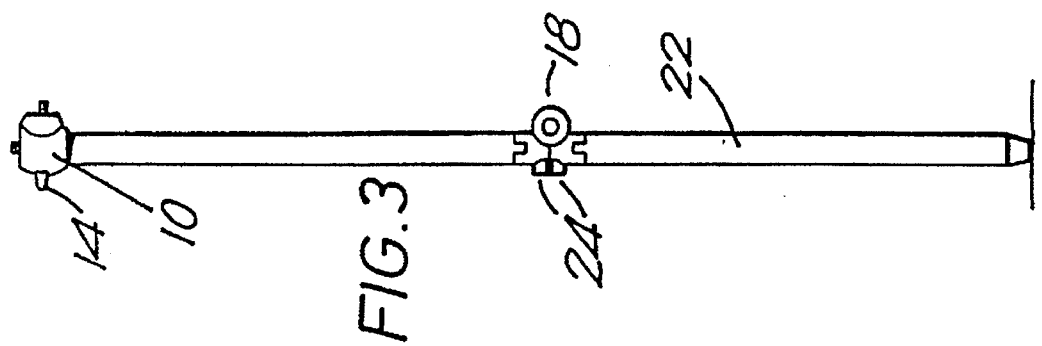
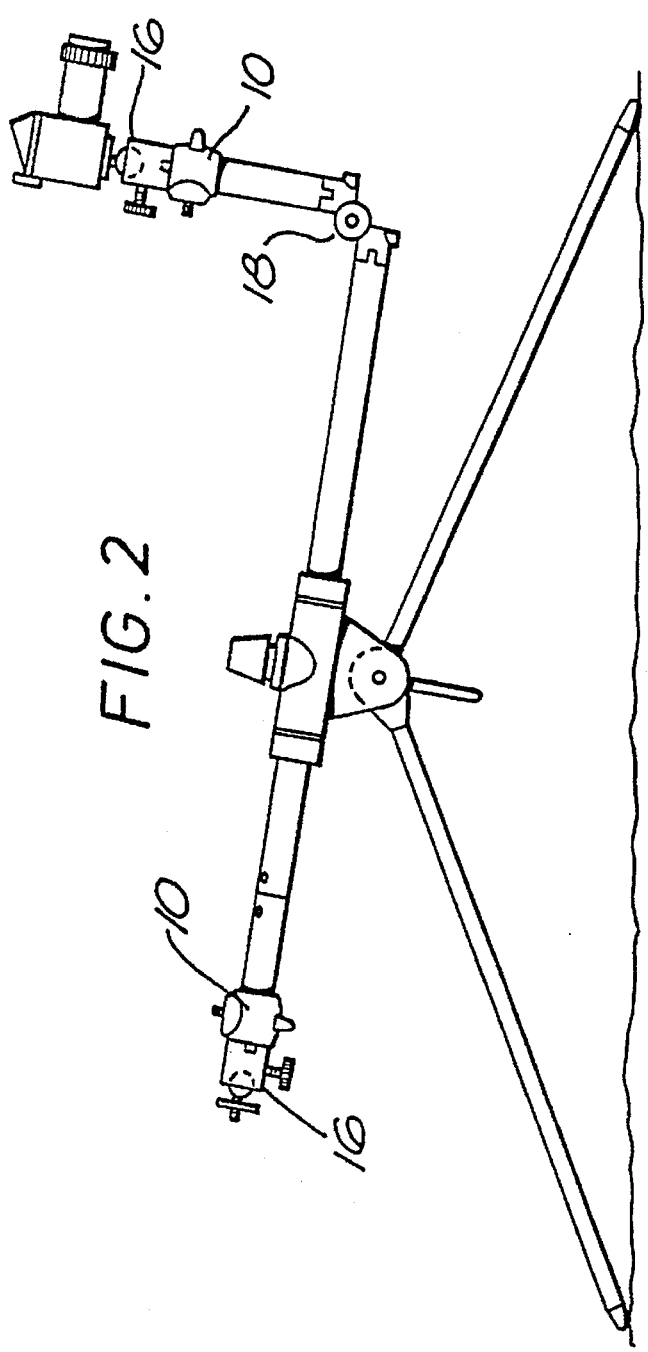
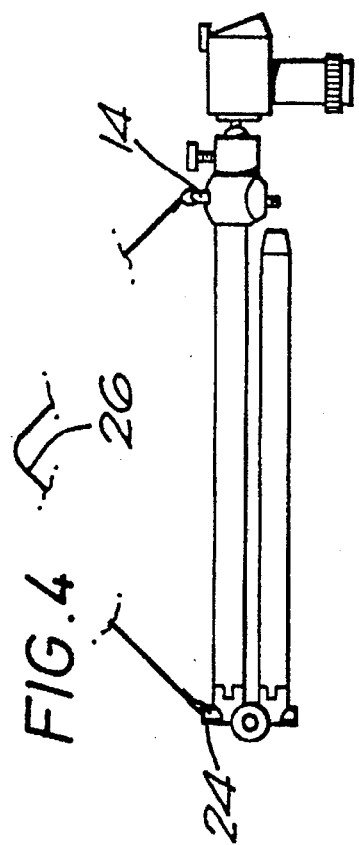

ANGLE HEAD TRIPOD

BACKGROUND OF THE INVENTION

This invention relates to tripods, and particularly to tripods for photographic use. It is particularly, although not exclusively applicable to tripods of the kind having a mounting head with an arcuate bolt carrying an article supporting bracket for mounting, and a plurality of wedge shaped spaces between the pivots at the top ends of the tripod legs. A tripod of this kind is described in our International Patent Application No. PCT/GB 91/01404, which relates to a tripod having a head with a slidable, article supporting pillar or centre column mounted on the head in a pillar guide which includes a pivotal bracket for attachment to the arcuate bolt, so that the pillar can be pivoted from a vertical to a horizontal position.

In normal use, a camera will be mounted on a tripod bush at one end of the centre column, by means of a ball and socket head, and thus, if the column is pivoted to a horizontal position, and the tripod legs are opened to a wide angle, it is possible to arrange the camera to be positioned close to the ground for "low angle" shoots. However, manipulation of the ball and socket head becomes very difficult in such positions, because in general, when the axis of ball and socket head is horizontal and its mounting is turned through 90°, i.e., so that the tripod bush is vertical, there is almost no further adjustability of position available from the ball and socket head.

SUMMARY OF THE INVENTION

Accordingly, the present invention seeks to provide a stand for a camera comprising a ground engageable support structure capable of supporting a pivotally mounted camera mounting pillar, a camera mounting member capable of being mounted on an end of said camera mounting pillar to mount a camera, characterised in that the camera mounting pillar is formed of two elongate members joined by a lockable pivoting joint.

Because the mounting pillar is jointed near the or each end upon which the camera is to be mounted, the end portion can be turned to a position in which it is at right angles to the axis of the other portion of the mounting pillar. In one embodiment, the or each end of the mounting pillar is provided with two mounting attachments, such as tripod screws of a known type, one of which projects axially from the end of the mounting pillar, whilst the other projects at right angles to it.

Preferably the portions of the mounting pillar are separable and the tripod is provided with at least one detachable leg which is adapted to be attached to one of the separable portions of the mounting pillar so as to form a monopod. For this purpose, the joint may include connection means which enable one part of the pillar to be removed and to be replaced by the tripod leg.

The invention also extends to a jointing device for a tubular tripod leg or mounting pillar of a tripod, comprising a spigot adapted to be fitted into the end of a tubular leg or pillar member, and a pivot disc having a pivot axis which is at right angles to the spigot axis and is offset therefrom, the pivot disc having one face which is adapted to mate with the corresponding face of the pivot disc of a second jointing member, whereby two such jointing members can be pivotally connected together by their pivot discs, in such a way that the two spigots are pivotable, relative to one another, through 180°; between a co-axial position, and a side-by-side, parallel position.

Preferably, the mating faces of the pivot discs are toothed so that they can be locked into a desired angular relationship.

Preferably, the or each jointing member is provided with attachment means for a carrying strap, and one or both ends of the mounting pillar may also be provided with such attachment means, as described in our above mentioned co-pending International Patent Application, so as to enable a carrying strap to be connected, either between the two ends of the central pillar, or between one end of the pillar and one of the jointing members, when the apparatus is configured as a monopod.

Accordingly, the invention also extends to a foldable monopod, comprising two tubular members connected together by a central pivoting joint, and including a first carrying strap attachment means at the joint, and a second carrying strap attachment means at the other end of one of the tubular members, to facilitate carrying the monopod in its folded condition.

In the above mentioned alternative embodiment of the invention, in which one end of the mounting pillar carries two tripod screws arranged at right angles to one another, the mounting pillar is preferably provided with a head having two flattened camera supporting surfaces arranged at right angles to one another, with a respective tripod screw arranged at the central portion of each surface. Preferably, the head also includes carrying strap attachment means on one side thereof, opposite to one of the supporting surfaces.

Preferably, in order to enable the apparatus to be used in a very low position, when it is configured as a tripod, the co-operating surfaces of the leg pivots and any intervening spacers for example the wedge shaped spacers shown in our above mentioned International Patent Application, are provided with fine radial knurling milling, so as to aid stability of the tripod particularly when the legs are spread widely apart, for low level camera work.

Some embodiments of the invention will now be described by way of example, with reference to the accompanying drawings:

BRIEF DESCRIPTION OF THE DRAWINGS

FIG. 2 shows the tripod of FIG. 1 in a "low camera angle" position;

FIG. 3 shows an adaptation of the tripod as a monopod;

FIG. 4 shows the monopod of FIG. 3 in a folded configuration for carrying;

FIG. 5b is a top plan view of the joint of FIG. 5a;

FIG. 5c is a front elevation of the joint of FIG. 5a;

FIG. 6b is a plan view of the head of FIG. 6a;

FIG. 6c is a front elevation of the head of FIG. 6a;

FIG. 7b is a further side elevation of the leg head of FIG. 7a, taken at right angles to the view of FIG. 7a.

DETAILED DESCRIPTION OF THE INVENTION

Figure 1:
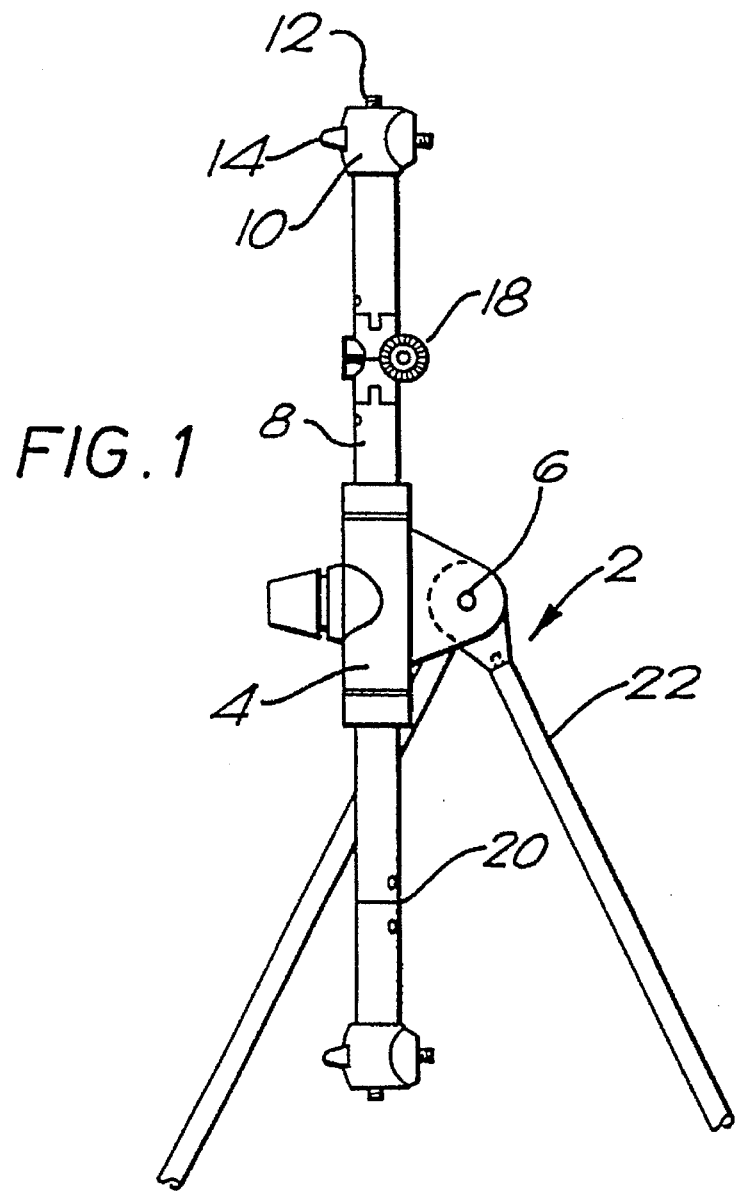
FIG. 1 is a partial side elevational view showing a tripod in accordance with the present invention in a upright erected condition.

Referring to FIG. 1, the tripod 2 illustrated by way of example, is of the type of whose mounting head comprises an arcuate bolt and plurality of wedge shaped spacers carried on the bolt, between pivot members at the top ends of each tripod leg. It will be appreciated, however, that the exact type of jointing method at the head of the tripod, is not critical to the primary features of the invention.

A tubular pillar guide 4 is pivotally mounted at 6 on the same arcuate bolt that carries the three leg heads, and a centre column or mounting pillar 8 is slidable in the pillar guide 4, so that the height of a camera mounted on one end of the centre column can be varied. As illustrated, the head 10 of the centre column has a tripod screw 12 on the top surface, and also an attachment ring 14 on one side, for attachment of the carrying strap. The latter arrangement is illustrated in more detail, in our International Patent Application No. PCT/GB 91/01404.

As illustrated in FIG. 2, when the tripod legs are opened out widely for "low angle" use, it is, of course, still possible to mount a ball and socket head 16, co-axially with the column, by means of an axial screw such as that illustrated at 12 in FIG. 1. However, the control of camera position and angle is then very restricted, and in practice it is rather difficult to position the camera, for example, in an accurate horizontal position.

Figure 1A:
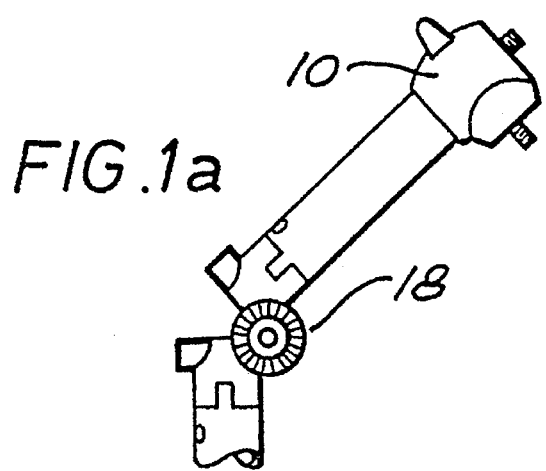
FIG. 1a shows a pivotable joint in a mounting pillar on the tripod of FIG. 1 in a pivoted position.

Accordingly, the centre column 8 is provided with a pivotable joint 18, shown in a pivoted position in FIG. 1a, near one end of the column 8, so that, as illustrated in FIG. 2, the head 10 at that end of the column can be moved to a substantially vertical position, even when the column is horizontal, thereby allowing the full range of adjustability of a ball and socket head 16 mounted on that end.

One of the legs 22 of the tripod, FIG. 1, may also be made removable from its corresponding "leg head", and the joint 18 is also so constructed that the column tube can be removed from it. This enables a "monopod" to be constructed from the leg 22 and the upper part of the column 8 carrying the camera support head 10, as illustrated in FIG. 3.

The pivotable joint 18 is provided with a lug 24 on each of its two sections, for the attachment of one end of a carrying strap, whilst the head 10 also carries a similar lug 14, as mentioned above with reference to FIG. 1, and as in illustrated in FIG. 4, this enables the monopod of FIG. 3 to be folded in half and have a carrying strap 26 attached, for easy portability.

Figure 5A:
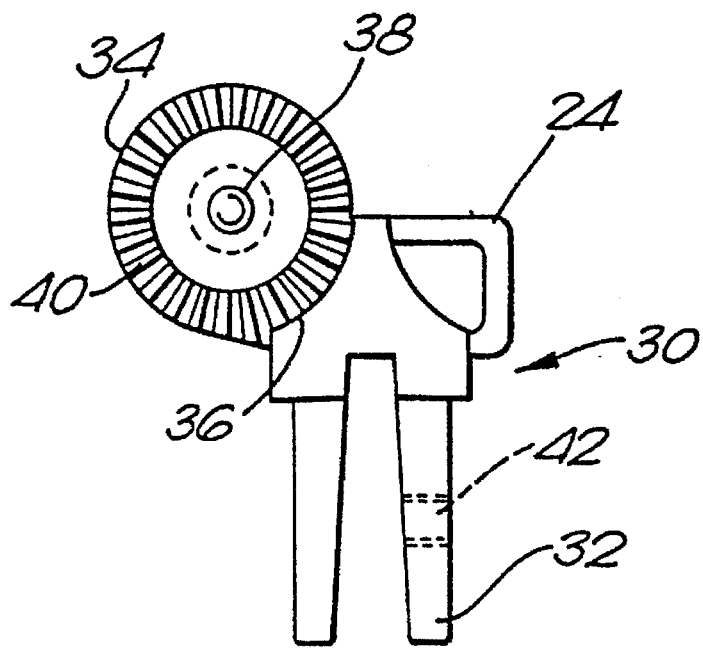
FIG. 5a is a side elevation of a folding joint for a column or leg.
Figure 5B:
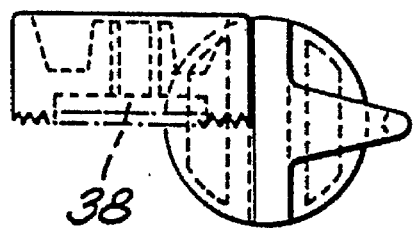

FIG. 5 illustrates the construction of the joint 18 in more detail, and this comprises a pair of identical castings 30, which include a dependent "spigot" 32 which fits inside the bore of the tubular leg or column. The head of the casting includes an outwardly projecting disc portion 34 connected to the main body of the casting by one quadrant of the disc 36, so that a vertical plane through the pivot axis 38 of the disc falls outside the circumference of the main body as will be seen more clearly from the plan view of FIG. 5b. The other side of the head of the joint member carries and lug 24 for a carrying strap, which extends outwardly in a direction opposite to that of the pivot disc 34.

Figure 5C:
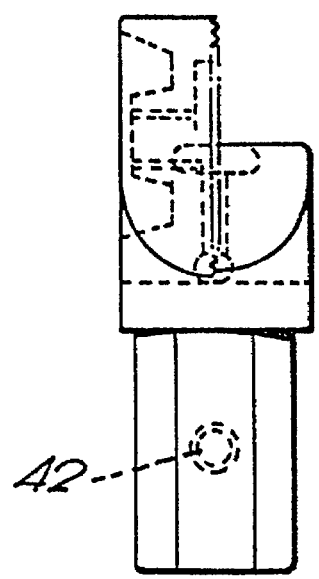

As will be appreciated from a consideration of the plan view of FIG. 5b, and the other elevational view of FIG. 5c, the body of the disc 34 is also offset to one side of a vertical plane through the leg axis of the joint, and this enables two such identical joint members to be connected together, with one "inverted" on top of the other, by means of a suitable pivot pin through the pivot discs, so as to form a joint which can be folded through 180°.

In order to assist in enabling the two discs to be "locked" in a wide range of relative angular positions, their mating surfaces are each provided with 48 radially extending teeth 40, which lock together when the pivot is screwed up tightly.

It will also be noted from FIG. 5a and 5c that the "spigot" 32 of the joint member is bifurcated one half being provided with a threaded hole 42 for a grub screw which is accessible through a corresponding hole in the tube which fits over the spigot. The grub screw extends through the hole 42 to abut against the other leg of the spigot, and thus when it is tightened the two legs are forced apart so that they are then locked against the inside surfaces of the leg tube.

Figure 6A:
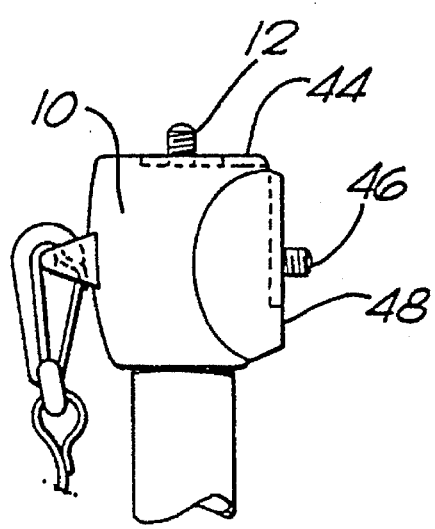
FIG. 6a is a side elevation of the head portion of an alternative type of centre column or pillar.
Figure 6B:
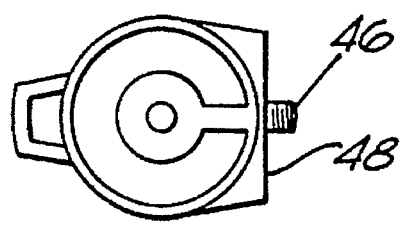
Figure 6C:
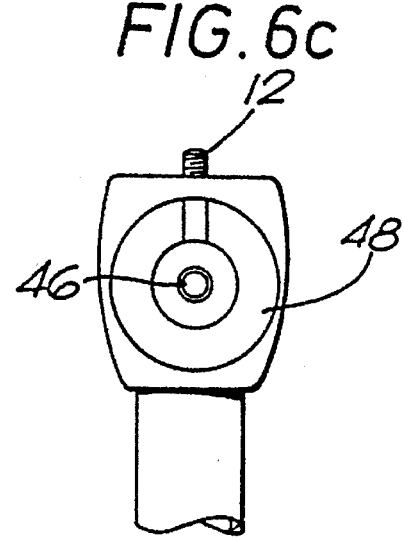

An alternative method of providing a "right angle" mounting for the camera on the end of the centre column, which does not require a jointing member as illustrated in the previous embodiment, is shown in FIG. 6, in which the head 10 is provided with a first, conventional mounting screw arrangement 12 on its flat upper surface 44, as illustrated in FIG. 6a, and is also provided with a further, laterally projecting screw 46 on one side surface 48 which is specially extended to provide an additional mounting "platform".

Figure 7A:
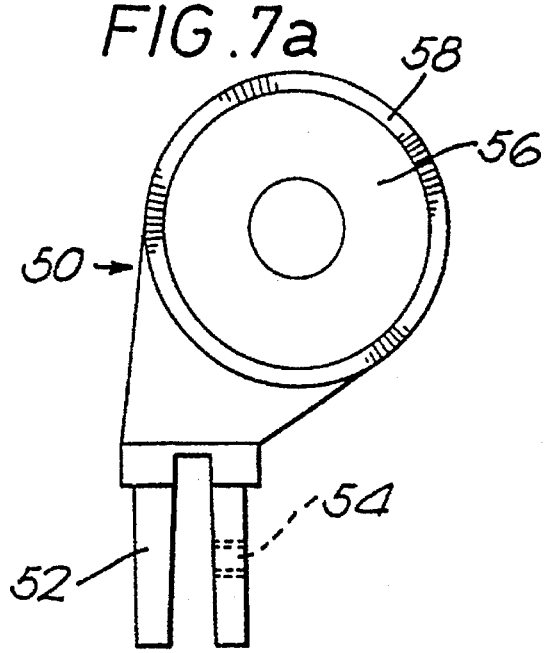
FIG. 7a is a side elevation of a pivotable leg head.
Figure 7B:
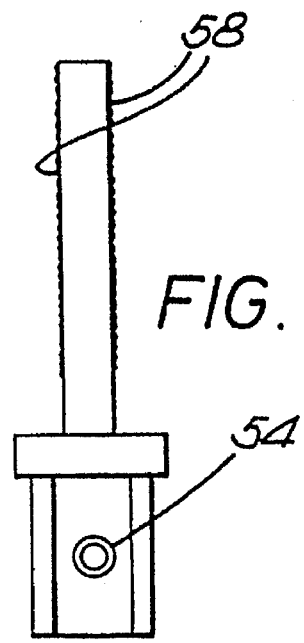

As illustrated in FIG. 7a, the "leg head" 50 of the tripod, by means of which the three legs are normally connected together, again includes a downwardly extending bifurcated spigot 52, which is also provided with a threaded hole 54 for a locking grub screw, to enable the leg to removed from the leg head, and to then be connected onto the jointing member 18, as described above to form the lower part of the monopod.

In addition, in order to provide improved stability to the tripod, particularly when it is in its "low angle" configuration, the pivot disc 56 of the leg head may also be provided with fine radial knurling or milling 58 on both sides, which abuts against corresponding milled surfaces on the intervening wedges or spaces of the tripod head, and thus provides a high level of frictional resistance against any tendency of the tripod to collapse or sag from its "wide-legged" position.

I claim:

1. A strand for a camera comprising a ground engageable support structure, a pivotally mounted camera mounting pillar (8) supported by said ground engageable support structure, a camera mounting member (10) mounted on an end of said camera mounting pillar (8) to mount a camera, characterized in that the camera mounting pillar (8) is formed of two tubular members joined by a lockable pivoting joint (18) and wherein the support structure comprises a multi legged structure including one leg (22) which is connected to said structure by a joint adapted to allow separation of the leg (22) so that the leg can be connected to a portion of the camera mounting pillar (8) separated from the stand to provide a monopod stand.

2. A stand according to claim 1 wherein said portion of the camera mounting pillar includes the lockable pivoting joint (18), whereby the monopod stand can be folded for compact carriage.

3. A stand according to claim 1 wherein the camera mounting member (10) comprises a ball and socket head (16).

4. A stand according to claim 1 wherein the camera mounting member (10) includes two mutually perpendicular camera engaging screws (12, 46), one of said screws (12)

being disposed to be parallel to the axis of the portion of the mounting pillar to which the camera mounting member (10) is attached.

5. A stand according to claim 1 wherein said lockable pivoting joint comprises a pair of mutually opposed co-axial disks (34) secured together by an axially extending shaft and clamping means whereby the disks are pressed together to lock the pivoting action.

6. A stand according to claim 5 wherein the clamping means comprises a locking screw and nut on the shaft.

7. A stand according to claim 5 wherein the locking action is enhanced by interengagable projections and recesses formed upon the engaging faces of the disks.

8. A stand according to claim 5 wherein the disks are each provided with a securing means projecting substantially tangentially from the periphery of the disk to engage with the portions of the camera mounting pillar (8) to permit 180° of pivot.

9. A stand according to claim 8 wherein the securing means is a spigot (32) which is bifurcated to be received into a tubular mounting pillar portion (8) and expanded by the action of a screw to clamp within the tube.

10. A stand according to claim 1 provided with a carrying strap (26).

11. A tripod for a camera comprising a head and a plurality of legs which are each pivotally connected at one end to said head, said head also carrying a camera mounting pillar, wherein said tripod legs are each separable from said head and provided with compatible joints to permit one of said plurality of legs to be joined to said camera mounting pillar to form a monopod stand.

12. The tripod of claim 11 wherein said camera mounting pillar comprises a lockable pivoting joint so that said monopod stand can be folded for compact carriage.

13. The tripod of claim 11 further comprising a camera mounting member mounted on an end of said camera mounting pillar.

14. The tripod of claim 13 wherein said camera mounting member comprises a ball and socket head.

15. The tripod of claim 13 wherein said camera mounting member comprises two mutually perpendicular camera engaging screws.

16. The tripod of claim 11 wherein said camera mounting pillar comprises two tubular members joined by a lockable pivoting joint.

17. The tripod of claim 16 wherein said lockable pivoting joint comprises a pair of mutually opposed coaxial discs secured together by an axially extending shaft and clamping means for pressing said discs together to lock said pivoting joint.

18. The tripod of claim 17 wherein said clamping means comprises a locking screw and a nut positioned on said shaft.

19. A stand for a camera comprising a ground engageable support structure, a pivotally mounted camera mounting pillar supported by said ground engageable support structure, a camera mounting member mounted on an end of said camera mounting pillar to mount a camera, wherein said camera mounting pillar is formed of two tubular members joined by a lockable pivoting joint and wherein said camera mounting member comprises two mutually perpendicular camera engaging screws, one of said screws being disposed parallel to an axis of a portion of said mounting pillar to which said camera mounting member is attached.

\* \* \* \* \*